United States Patent
Hagenlocher et al.

(10) Patent No.: US 10,814,422 B2
(45) Date of Patent: Oct. 27, 2020

(54) DETERMINING DISTANCE CORRECTION VALUES FOR LASER MACHINING A WORKPIECE

(71) Applicant: TRUMPF Laser- und Systemtechnik GmbH, Ditzingen (DE)

(72) Inventors: Tobias Hagenlocher, Ditzingen (DE); Thomas Kieweler, Wimsheim (DE); Michael Reyer, Stuttgart (DE); Wolf Wadehn, Nussdorf (DE)

(73) Assignee: TRUMPF Laser-und Systemtechnik GmbH, Ditzingen (DE)

( * ) Notice: Subject to any disclaimer, the term of this patent is extended or adjusted under 35 U.S.C. 154(b) by 710 days.

(21) Appl. No.: 15/430,700

(22) Filed: Feb. 13, 2017

(65) Prior Publication Data
US 2017/0151629 A1 Jun. 1, 2017

Related U.S. Application Data

(63) Continuation of application No. PCT/EP2015/068439, filed on Aug. 11, 2015.

(30) Foreign Application Priority Data

Aug. 13, 2014 (DE) ........................ 10 2014 421 608

(51) Int. Cl.
*B23K 26/04* (2014.01)
*G05B 19/19* (2006.01)

(52) U.S. Cl.
CPC ............ *B23K 26/048* (2013.01); *G05B 19/19* (2013.01); *G05B 2219/37281* (2013.01); *G05B 2219/37397* (2013.01); *G05B 2219/45165* (2013.01)

(58) Field of Classification Search
CPC .. B23K 26/048; B23K 26/046; B23K 26/042; B23K 26/02; B23K 26/03; G05B 19/19; G05B 2219/37281
(Continued)

(56) References Cited

U.S. PATENT DOCUMENTS

2010/0200552 A1* 8/2010 Mienhardt ........... B23K 26/046
219/121.72
2013/0103183 A1 4/2013 Mochida

FOREIGN PATENT DOCUMENTS

CN 101784894 7/2010
CN 102528288 7/2012
(Continued)

OTHER PUBLICATIONS

Machine translation of DE 102011006447 performed on Sep. 13, 2019.*
(Continued)

*Primary Examiner* — Tu B Hoang
*Assistant Examiner* — Alba T Rosario-Aponte
(74) *Attorney, Agent, or Firm* — Fish & Richardson P.C.

(57) ABSTRACT

Methods, machines, and computer-readable mediums for determining distance correction values of a desired distance between a laser processing nozzle on a laser processing head and a workpiece during laser processing of the workpiece are provided. In some implementations, the workpiece is scanned along a desired path of a surface of the workpiece separately by the laser processing nozzle and a measurement head arranged in place of the laser processing nozzle on the laser processing head, with a capacitively measured distance identical to the desired distance. The measurement head has a lower lateral sensitivity of a capacitance measurement than the laser processing nozzle. Respective scanned movement paths of the laser processing nozzle and the measurement
(Continued)

head are determined. The distance correction values for the desired distance of the laser processing nozzle are then determined from the scanned movement paths determined with the laser processing nozzle and the measurement head.

7 Claims, 2 Drawing Sheets

(58) Field of Classification Search
USPC .................. 219/121.67, 121.68, 121.69
See application file for complete search history.

(56) References Cited

FOREIGN PATENT DOCUMENTS

| | | |
|---|---|---|
| CN | 102706383 | 10/2012 |
| CN | 103433623 | 12/2013 |
| CN | 103492831 | 1/2014 |
| CN | 103717343 | 4/2014 |
| CN | 103743345 | 4/2014 |
| DE | 10121655 C1 * | 10/2002 |
| DE | 10121655 C1 | 10/2002 |
| DE | 102011006447 A1 * | 10/2012 |
| JP | 2002-011587 | 1/2002 |
| JP | 2011059335 | 3/2011 |
| JP | 2013254544 | 12/2013 |
| WO | WO2012022718 A1 | 2/2012 |

OTHER PUBLICATIONS

Machine translation of DE10121655 performed on Sep. 13, 2019.*
Chinese Office Action in Application No. 201580043070.8, dated Dec. 5, 2017, 8 pages (with English translation).
International Search Report for corresponding PCT Application No. PCT/EP2015/068439, dated Jan. 8, 2016, 4 pages.
CN Office Action in Chinese Application No. 201811306673.4, dated Mar. 31, 2020, 8 pages (with English translation).

* cited by examiner

DETERMINING DISTANCE CORRECTION VALUES FOR LASER MACHINING A WORKPIECE

CROSS-REFERENCE TO RELATED APPLICATIONS

This application is a continuation of and claims priority under 35 U.S.C. § 120 to PCT Application No. PCT/EP2015/068439 filed on Aug. 11, 2015, which claims priority to German Application No. DE 10 2014 216 084.7, filed on Aug. 13, 2014. The entire contents of these priority applications are incorporated herein by reference.

TECHNICAL FIELD

The present invention relates to a method of determining distance correction values of a desired distance between a laser processing nozzle and a workpiece during laser processing of the workpiece, and to a laser processing machine suitable for performing this method.

BACKGROUND

During laser processing of a workpiece, a focal position of the laser beam is directly related to a distance between a laser processing nozzle, from which the laser beam exits together with a process gas, and the workpiece. Consequently, this nozzle distance from the workpiece is continuously monitored and controlled to a fixedly specified desired distance by moving the laser processing head during laser processing toward the workpiece or away from it. For an optimum cutting result, a deviation of the nozzle distance of ±0.5 mm is still within an acceptable tolerance.

The distance measurement between the laser processing nozzle and the workpiece is frequently capacitive and takes place by measuring the capacitance between the electrically conducting laser processing nozzle and the electrically conducting workpiece and determining therefrom the nozzle distance on the basis of a characteristic. This characteristic, that is, a unique relationship between the measured capacitance and the associated nozzle distance, is recorded by way of a planar metal sheet. However, in three-dimensional workpieces, internal and external corners result in deviations from the characteristic and thus an erroneous measurement of the nozzle distance, as a result of which for example the quality of the laser cut is negatively impacted. Until now, this systematic problem has been addressed by way of correction values of the desired distance, which must be empirically determined manually with significant time expenditure and which must be entered or matched to the corresponding locations of the NC program of the workpiece.

WO 2012/022718 A1 discloses a capacitive measurement of the distance of a laser processing nozzle from a workpiece. In order to establish a unique relationship between the capacitance and the nozzle distance, a characteristic on a planar workpiece is recorded. However, if the geometry of the workpiece is not constant along the entire desired path, the distance signal also changes with the workpiece geometry, which can result in an inaccurate determination of the nozzle distance. Various nozzle geometries are described, which have a low lateral sensitivity of the capacitance measurement to reduce in this way the influence of the workpiece geometry on the distance signal.

SUMMARY

One aspect of the present invention features a method of determining distance correction values of a desired distance between a laser processing nozzle on a laser processing head and a workpiece for laser processing of the workpiece, the method comprising: scanning the workpiece by the laser processing nozzle arranged on the laser processing head along a desired path of a surface of the workpiece, and, during the scanning by the laser processing nozzle, capacitively measuring a distance between the laser processing nozzle and the workpiece and controlling the measured distance to be the desired distance to obtain a first actual movement path; scanning the workpiece by a measurement head arranged in place of the laser processing nozzle on the laser processing head along the same desired path of the surface of the workpiece, the measurement head having a lower lateral sensitivity of a capacitance measurement than the laser processing head, and, during the scanning by the measurement head, capacitively measuring a distance between the measurement head and the workpiece and controlling the measured distance to be the same desired distance of controlling the laser processing nozzle to obtain a second actual movement path; and determining the distance correction values of the desired distance between the laser processing nozzle and the workpiece along the desired path based on the obtained first actual movement path and the obtained second actual movement path.

The method can include laser processing the workpiece by scanning the workpiece by the laser processing nozzle arranged on the laser processing head along the surface of the workpiece; during the laser processing, capacitively measuring a distance between the laser processing nozzle and the workpiece; and controlling the measured distance to be a corrected desired distance that is based on the desired distance and the distance correction values.

The method can include laser processing the workpiece or an identical workpiece by scanning the workpiece or the identical workpiece by the laser processing nozzle arranged on the laser processing head along the desired path based on the distance correction values.

In some cases, a workpiece is scanned both by a laser processing nozzle arranged on a laser processing head and a measurement head which is arranged on the laser processing head in place of the laser processing nozzle and has a lower lateral sensitivity of the capacitance measurement than the laser processing nozzle, in each case with a pre-set desired distance, and the scanning movement path of the laser processing nozzle is thus determined, and that the distance correction values for the desired distance of the laser processing nozzle along the desired movement path during the laser processing of the workpiece are determined from the movement paths which are determined with the laser processing nozzle and with the measurement head. The laser processing nozzle and the measurement head can travel across the workpiece with the same desired distance.

In some implementations, with both the measurement head and the actual laser processing nozzle scanning the workpiece, specifically with specification of the non-corrected fixedly specified desired distance, in each case the workpiece topography is determined on the basis of the scanned movement paths of the measurement head and the laser processing nozzle. Since the measurement head has a lower lateral sensitivity of the capacitance measurement than the laser processing nozzle, the distance signal of the measurement head—unlike the distance signal of the laser processing nozzle—is not influenced by the workpiece geometry. In some cases, the distance of the measurement head along the entire scanned movement path therefore corresponds to the specified desired distance, whereas the distance of the laser processing nozzle in the case of internal and external corners is significantly greater than the specified desired distance. The measurement head is therefore better suited to the precise, geometry-independent maintenance of the distance between the laser processing nozzle and the workpiece than the laser processing nozzle.

The desired movement path is thus scanned once with the higher distance measurement accuracy of the measurement head, and once with the lower distance measurement accuracy of the laser processing nozzle, with the (local) distance correction values for the movement path of the laser processing nozzle, which are required for maintaining the desired distance, being calculated from the difference of the scanned movement paths. During processing of identical components in a series, these distance correction values are now taken into account and the desired distance between workpiece and laser processing nozzle is kept constant within a narrower tolerance window than before.

This invention enables to develop a method of the type mentioned above such that the distance correction values can be determined as easily as possible and without great time expenditure, and to specify a laser processing machine which is suitable for performing the method.

The following advantages can be attained in particular with the invention:
time saving for setting up a component;
less process knowledge required of the operator;
reduction of error sources by automation;
small quantities become interesting for laser processing.

The measurement head is preferably configured in the form of a measurement tip, the diameter of which at the workpiece-facing measurement end is smaller than the nozzle diameter at the workpiece-facing nozzle end of the laser processing nozzle. A shaft of the measurement tip is either composed of electrically non-conducting material or is surrounded by a grounded shielding in order to reduce the lateral sensitivity of the capacitance measurement.

For a workpiece type to be processed, the associated distance correction values for the desired distance of the laser processing nozzle along the desired movement path are with particular preference taken as the corrected desired distances in an NC program for laser processing of the workpiece. If a determination is made on the basis of the scanned movement paths that a desired nozzle distance, which is set in the NC program for laser processing a workpiece, of for example 1.0 mm in an internal corner of the workpiece were to lead to an actual nozzle distance of 1.25 mm, then the desired nozzle distance in this internal corner will be reduced to 0.75 mm in the NC program, which during laser processing of the workpiece in the internal corner then results in the wanted actual nozzle distance of 1.0 mm.

The laser processing of a workpiece along the desired movement path is effected, with further preference, with the distance correction values that were determined previously on this workpiece or on an identical workpiece, as a result of which the nozzle distance, even in three-dimensional workpieces, can be kept constant within a narrow tolerance range.

Another aspect of the present invention features a machine for laser processing a workpiece, in particular a three-dimensional (3D) laser machine or a pipe processing machine, comprising: a laser processing nozzle configured to be arranged on a laser processing head; a measurement head configured to be arranged in place of the laser processing nozzle on the laser processing head; a distance measurement device configured to: capacitively measure a distance between the laser processing nozzle and a workpiece when scanning the workpiece by the laser processing nozzle along a surface of the workpiece, and capacitively measure a distance between the measurement head and the workpiece when scanning the workpiece by the measurement head along the surface of the workpiece; a machine controller configured to: move the laser processing nozzle along a desired path and, during the scanning by the laser processing nozzle, control the measured distance of the laser processing nozzle from the workpiece to be a desired distance, and obtain a first actual movement path, and move the measurement head along the same desired path and, during the scanning by the measurement head, control the measured distance of the measurement head from the workpiece to be the same desired distance of controlling the laser processing, and obtain a second actual movement path; and a distance correction device configured to: determine distance correction values for the desired distance of the laser processing nozzle based on the first actual movement path and the second actual movement path. The distance correction device can be integrated in the machine controller.

The distance measurement device is configured to capacitively measure a distance between the laser processing nozzle and the workpiece during laser processing the workpiece, and the machine controller is configured to control the measured distance to be a corrected desired distance that is based on the desired distance and the distance correction values.

The workpiece laser processing machine is configured to process the workpiece or an identical workpiece by scanning the workpiece or the identical workpiece by the laser processing nozzle arranged on the laser processing head along the desired path based on the distance correction values. The distance correction device is configured to store the distance correction values for the desired distance of the laser processing nozzle in a numerical control (NC) program for laser processing of workpieces having a workpiece type same as the workpiece. In some implementations, the measurement head is configured to be a measurement tip, and a diameter of the measurement tip at a workpiece-facing measurement end is smaller than a nozzle diameter at a workpiece-facing nozzle end of the laser processing nozzle.

A further aspect of the invention features a computer program product, comprising code means that are adapted for performing all the steps of the above described method if the program is executed on a machine controller of a laser processing machine.

Further advantages of the invention can be gathered from the claims, the description and the drawing. The features which are mentioned above and will be referred to later can likewise be used alone or in groups in any desired combination. The illustrated and described embodiments are not to be understood as a conclusive list, but rather have an exemplary character for the description of the invention.

DETAILED DESCRIPTION

Figure 1:
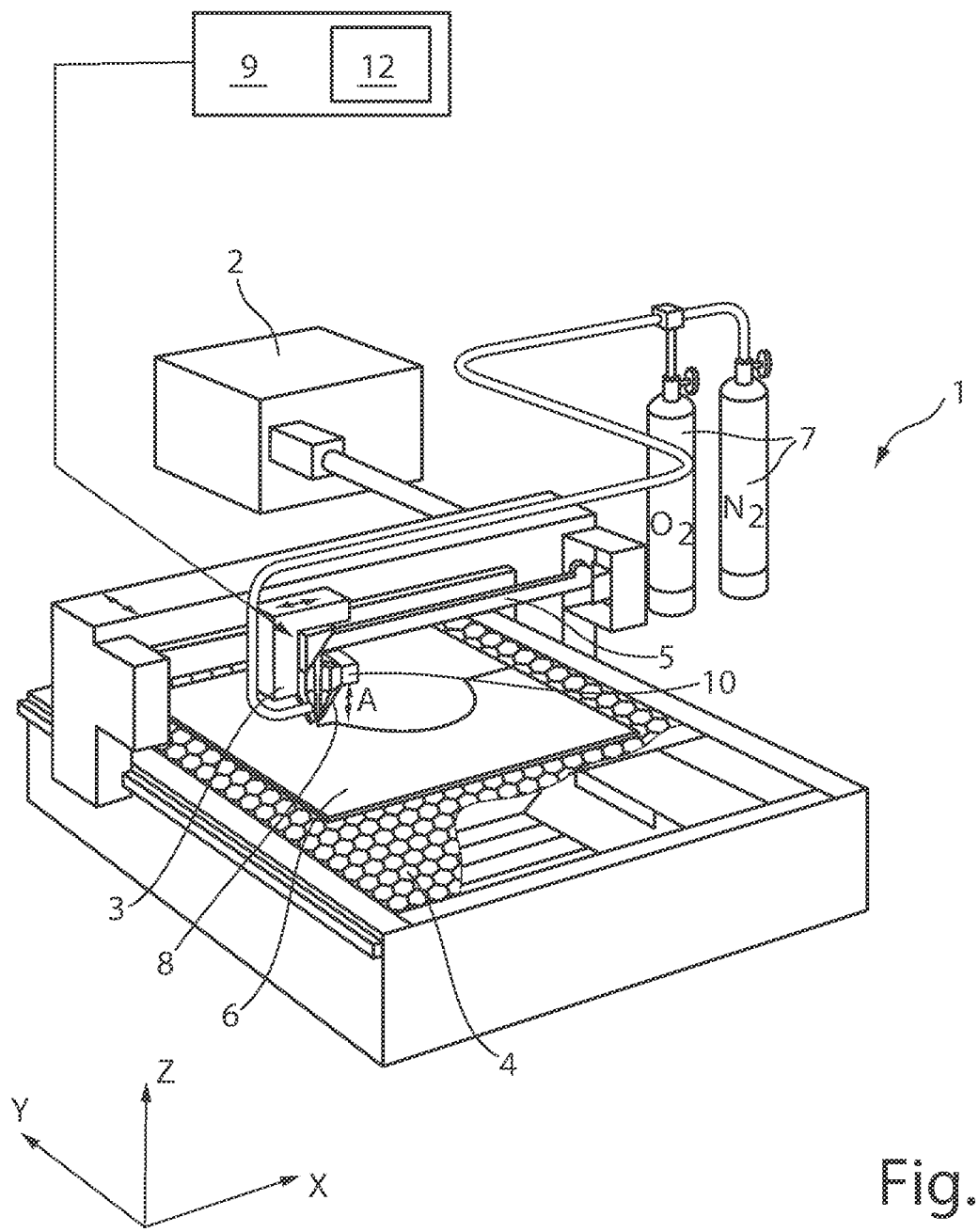
FIG. 1 shows an example laser processing machine suitable for performing a method of determining distance correction values.

A laser processing machine 1, illustrated in FIG. 1 perspectively as a flatbed laser cutting machine, comprises a laser beam generator 2, configured for example as a $CO_2$ laser, a diode laser or a solid-state laser, a laser processing head 3, which is displaceable in X, Y and Z directions, and a workpiece support 4. In the laser beam generator 2, a laser beam 5 is generated, which is guided, using an optical waveguide (not shown) or deflection mirrors (not shown), from the laser beam generator 2 to the laser processing head 3. The laser beam 5 is directed, using a focusing optics arranged in the laser processing head 3, at a workpiece (for example a metal sheet) 6, which is placed on the workpiece support 4. The laser processing machine 1 is also supplied with process gases 7, such as oxygen and nitrogen. The process gases 7 are supplied to a laser processing nozzle 8 of the laser processing head 3, in which the laser processing nozzle 8 is configured in a form of a cutting gas nozzle and from which the process gases 7 exit together with the laser beam 5 so as to cut the workpiece 6. The laser processing machine 1 furthermore comprises a machine controller 9 for moving the laser processing head 3 together with the laser processing nozzle 8 along a desired movement path.

Figure 2A:
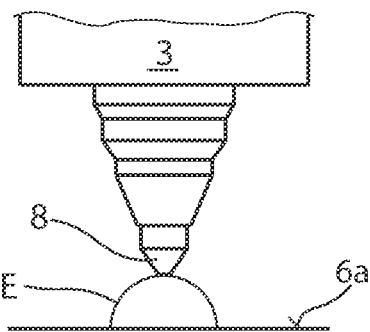
FIGS. 2A and 2B show field lines of capacitive distance measurement of a laser processing nozzle to a planar workpiece (FIG. 2A) and to an internal corner of a three-dimensional workpiece (FIG. 2B).
Figure 2B:
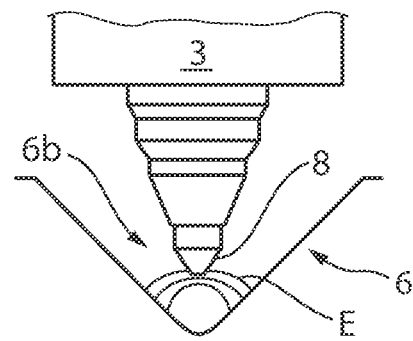

During the laser processing, a distance (also called "nozzle distance") A of the laser processing nozzle 8 from the workpiece 6 is continuously measured and controlled to a desired distance by moving the laser processing head 3 toward the workpiece 6 or away from the workpiece 6. Integrated in the laser processing head 3 is a distance measurement device 10 for capacitively measuring the distance A between the metal laser processing nozzle 8 and the metal workpiece 6. During the distance measurement, a voltage source of the distance measurement device 10 generates a specified potential difference between the laser processing nozzle 8 and the workpiece 6, with the result that an electric field E is formed between them, field lines of which are shown in FIGS. 2A and 2B. FIG. 2A shows the field lines in the capacitive distance measurement to a planar workpiece surface 6a, which extends parallel to the XY plane, and FIG. 2B shows the field lines to an internal corner 6b of a three-dimensional workpiece 6.

The position or the length of the field lines and thus the capacitance changes as a function of the nozzle distance A. To determine a relationship between the distance A and the capacitance, for example a capacitance measurement with a variable known distance A can be effected to obtain a characteristic for the nozzle distance A as a function of the capacitance. The nozzle distance A is then determined either in the distance measurement device 10 itself or in another structural unit, which is provided in the laser processing machine 1, on the basis of the characteristic and the measured capacitance. To obtain a unique relationship between the capacitance and the nozzle distance A during calibration of the distance measurement device 10, a planar workpiece 6 is typically used, as shown in FIG. 2A, for determining the characteristic. However, if, as is shown in FIG. 2B, the geometry of the workpiece 6 is not constant over the entire processing duration, the distance signal measured with the laser processing nozzle 8 changes on the basis of the lateral extent of the electric field E, that is to say on the basis of the lateral sensitivity of the capacitance measurement, not just with the nozzle distance A but also with the workpiece geometry. In a three-dimensional workpiece, the desired distance between the laser processing nozzle 8 and the workpiece 6 therefore cannot be kept constant within a narrow tolerance range. This systematic problem can be addressed by correction values of the desired distance, which are entered or adapted to the corresponding locations of a numerical control (NC) program of the workpiece 6.

Figure 3A:
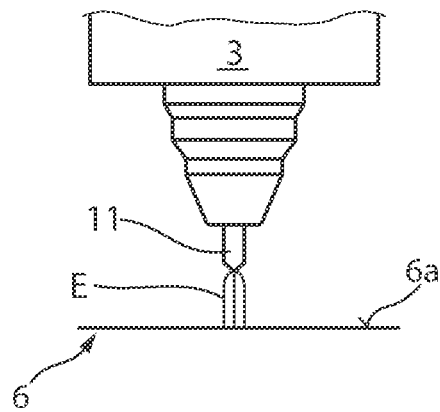
FIGS. 3A and 3B show field lines of capacitive distance measurement of a measurement head to a planar workpiece (FIG. 3A) and to an internal corner of a three-dimensional workpiece (FIG. 3B).
Figure 3B:
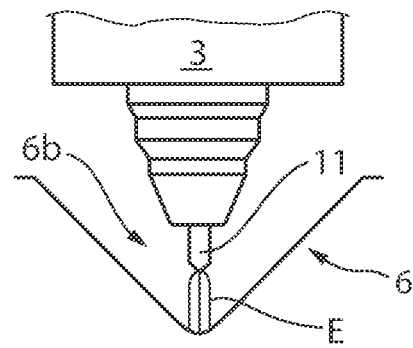
Figure 4:
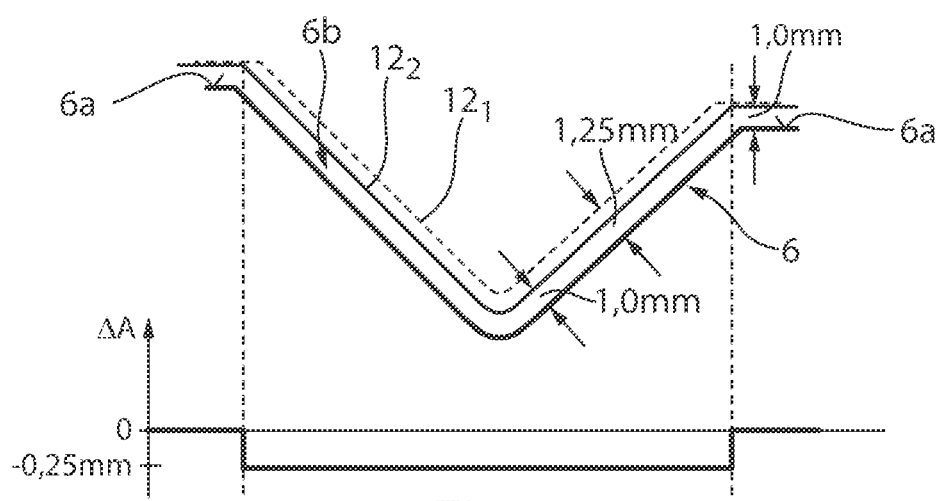
FIG. 4 shows example movement paths of a laser processing nozzle and a measurement head which are scanned with a specification of a same desired distance to an internal corner of a three-dimensional workpiece, and correction values determined therefrom for the desired distance of the laser processing nozzle during laser processing of the workpiece.

For determining the distance correction values $\Delta A$, the workpiece 6, as shown in FIG. 4, is scanned both by the laser processing nozzle 8 itself and by a measurement head 11 (as shown in FIGS. 3A, 3B), which is arranged on the laser processing head 3 in place of the laser processing nozzle 8 and has a lower lateral sensitivity of the capacitance measurement than the laser processing nozzle 8, in each case with the specification of the same desired distance, e.g., 1.0 mm. In the process, the respectively scanned movement path and thus the actual distance of the laser processing nozzle 8 and the measurement head 11 is determined. The actual distance of the laser processing nozzle 8 along the scanned movement path is illustrated as a dashed curve $12_1$, and the actual distance of the measurement head 11 along the scanned movement path is illustrated as a solid curve $12_2$.

As is schematically shown in FIGS. 3A, 3B, the measurement head 11, which is not capable of cutting, has a lower lateral extent of the electric field E and is therefore independent of the workpiece geometry. The measurement head 11 can be configured in the form of a measurement tip, the diameter of which at the workpiece-facing measurement end is smaller than the nozzle diameter on the workpiece-facing nozzle end of the laser processing nozzle 8.

In an example, the determined actual distance of the measurement head 11 is 1.0 mm along the entire scanned movement path, e.g., which corresponds to the desired distance. The determined actual distance of the laser processing nozzle 8 is likewise 1.0 mm at the planar workpiece surfaces 6a, but 1.25 mm at the internal corner 6b, which only corresponds to the desired distance at the planar workpiece regions 6a. A device 12, which is integrated for example in the machine controller 9, determines the distance correction values $\Delta A$ for the desired distance of the laser processing nozzle 8 along the desired movement path during the laser processing of the workpiece 6 on the basis of the movement paths determined using the laser processing nozzle 8 and using the measurement head 11. In the present example, a distance correction value $\Delta A$ of 0.25 mm is determined for the internal corner 6b, by which the desired distance contained in the NC program is corrected. During laser processing of this or an identical workpiece 6, a nozzle distance A of 1 mm is obtained, which is kept constant along the entire scanned desired movement path within a narrow tolerance window.

The distance correction values $\Delta A$ can also be determined, instead of from the difference of actual distances, from the difference of the controller output in X, Y and Z directions of the distance control during scanning of the laser processing nozzle 8 and the measurement head 11. For example, the actual movement path can be determined from the controller output values of the motion axis drives. Distance correction values $\Delta A$ can also be controller values for one or more motion axis drives. If during scanning of the laser processing nozzle a different controller output value of a z-axis drive is determined than during scanning of the measurement head, the determined difference can be set as distance correction value ΔA for the output controller of the z-axis drive.

A number of embodiments of the invention have been described. Nevertheless, it will be understood that various modifications may be made without departing from the spirit and scope of the invention. Accordingly, other embodiments are within the scope of the following claims.

What is claimed is:

1. A method of determining distance correction values of a desired distance between a laser processing nozzle on a laser processing head and a workpiece for laser processing of the workpiece, the laser processing head being configured for fixing one of the laser processing nozzle and a measurement head, the method comprising:

before laser processing the workpiece, arranging the laser processing nozzle on the laser processing head, and scanning the workpiece by the laser processing nozzle arranged on the laser processing head along a desired movement path of a surface of the workpiece, and, during the scanning by the laser processing nozzle, capacitively measuring a distance between the laser processing nozzle and the workpiece by a distance measurement device and controlling the measured distance to be the desired distance to obtain a first actual movement path;

before laser processing the workpiece, arranging the measuring head on the laser processing head, the measurement head having a lower lateral sensitivity of a capacitance measurement than the laser processing nozzle, and scanning the workpiece by the measurement head along the desired movement path of the surface of the workpiece, and, during the scanning by the measurement head, capacitively measuring a distance between the measurement head and the workpiece by the distance measurement device and controlling the measured distance to be the desired distance to obtain a second actual movement path; and before laser processing the workpiece, determining the distance correction values of the desired distance between the laser processing nozzle and the workpiece along the desired movement path based on the obtained first actual movement path and the obtained second actual movement path.

2. The method of claim 1, further comprising:
laser processing the workpiece by scanning the workpiece by the laser processing nozzle arranged on the laser processing head along the desired movement path of the surface of the workpiece;

during the laser processing, capacitively measuring a distance between the laser processing nozzle and the workpiece; and controlling the measured distance to be a corrected desired distance that is based on the desired distance and the distance correction values.

3. The method of claim 1, further comprising:
laser processing the workpiece or an identical workpiece by scanning the workpiece or the identical workpiece by the laser processing nozzle arranged on the laser processing head along the desired movement path based on the distance correction values.

4. The method of claim 1, further comprising:
storing the distance correction values for the desired distance of the laser processing nozzle in a numerical control (NC) program for laser processing of workpieces having a workpiece type same as the workpiece.

5. The method of claim 1, wherein the measurement head is configured to be a measurement tip, and
wherein a diameter of a workpiece-facing measurement end of the measurement tip is smaller than a nozzle diameter of a workpiece-facing nozzle end of the laser processing nozzle.

6. The method of claim 1, wherein arranging the measuring head on the laser processing head comprises:
replacing the laser processing nozzle with the measuring head on the laser processing head.

7. The method of claim 1, wherein capacitively measuring a distance between the laser processing nozzle and the workpiece by a distance measurement device comprises: configuring a voltage source of the distance measurement device to generate a specified potential difference between the laser processing nozzle and the workpiece to form an electric field between the laser processing nozzle and the workpiece, and
wherein capacitively measuring a distance between the measurement head and the workpiece by the distance measurement device comprises: configuring the voltage source of the distance measurement device to generate the specified potential difference between the measurement head and the workpiece to form an electric field between the measurement head and the workpiece.

* * * * *

UNITED STATES PATENT AND TRADEMARK OFFICE
CERTIFICATE OF CORRECTION

PATENT NO. : 10,814,422 B2
APPLICATION NO. : 15/430700
DATED : October 27, 2020
INVENTOR(S) : Tobias Hagenlocher et al.

Page 1 of 1

It is certified that error appears in the above-identified patent and that said Letters Patent is hereby corrected as shown below:

On the Title Page

Column 1, (30) Foreign Application Priority Data, delete "10 2014 421 608" and insert -- 10 2014 216 084.7 --

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*